US008971083B1

(12) United States Patent
Johnson

(10) Patent No.: US 8,971,083 B1
(45) Date of Patent: Mar. 3, 2015

(54) RECREATIONAL VEHICLE TRANSFORMER

(76) Inventor: John Michael Johnson, Vicksburg, MI (US)

(*) Notice: Subject to any disclaimer, the term of this patent is extended or adjusted under 35 U.S.C. 154(b) by 781 days.

(21) Appl. No.: 12/661,922

(22) Filed: Mar. 26, 2010

(51) Int. Cl.
H02M 1/10 (2006.01)
H02M 1/00 (2006.01)

(52) U.S. Cl.
USPC .......................... 363/142; 363/146

(58) Field of Classification Search
USPC ................................. 363/142–147
See application file for complete search history.

(56) References Cited

U.S. PATENT DOCUMENTS

| 3,641,472 | A | * | 2/1972 | Phillips, Jr. | 439/34 |
| 3,833,821 | A | * | 9/1974 | Weaver | 307/150 |
| 4,271,452 | A | * | 6/1981 | Lee | 361/231 |
| 5,066,939 | A | * | 11/1991 | Mansfield, Jr. | 455/402 |
| 5,589,760 | A | * | 12/1996 | Lee | 323/247 |
| 5,726,561 | A | * | 3/1998 | Ghosh et al. | 323/255 |
| D414,460 | S | * | 9/1999 | Hughes | D13/110 |
| 6,603,352 | B2 | * | 8/2003 | Wight | 330/251 |
| 6,856,497 | B2 | * | 2/2005 | Suzui et al. | 361/42 |
| D546,761 | S | * | 7/2007 | Schnackenberg | D13/122 |
| 7,333,316 | B1 | * | 2/2008 | Norris | 361/111 |
| 8,089,747 | B2 | * | 1/2012 | Storck et al. | 361/641 |
| 2005/0212526 | A1 | * | 9/2005 | Blades | 324/543 |

* cited by examiner

Primary Examiner — Emily P Pham
(74) Attorney, Agent, or Firm — Joseph K. Andonian

(57) ABSTRACT

A transformer for connecting a 50 A RV normally wired for 110 volts of electricity to foreign receptacles providing 220 volts of electricity. The transformer employs two cords on the input side of the transformer that can be connected to the two receptacles normally provided between side-by-side campsites in a campground. The transformer also employs a separate circuit breaker in each hot lead on the secondary side of the circuit employed in the transformer.

6 Claims, 3 Drawing Sheets

RECREATIONAL VEHICLE TRANSFORMER

This invention relates to a recreational vehicle (RV) transformer that is suitable for connecting a recreational vehicle built for use in the United States to electrical outlets located outside the U.S., most especially in Europe.

BACKGROUND OF INVENTION

Electrical outlets in the U.S. generally provide 110 volts, 60 hz and 30-50 amps of electricity. Electrical outlets in Europe generally provide 220 volts, 50 hz and 16 amps of electricity. Most foreign countries have 220 volt systems. RVs built in the U.S. are wired for 110-120 volt systems. The large RVs generally require 50 amperes of current (generally referred to as a 50 A RV) and the smaller ones generally require 30 amperes (generally referred to as a 30 A RV). The electrical appliances in 50 A RVs cannot be fully utilized when connected to electrical outlets in Europe without rewiring at considerable expense amounting to several thousands of dollars. While an ordinary transformer can convert 220 volts to 110 volts with sufficient current for use in a 30 A RV, it cannot work satisfactorily for a 50 A RV since more than one appliance is often used at the same time in the 50 A RV and together may require as much as 50 amps of electrical current in addition to 110-120 volts.

50 A U.S. RVs have cords with four pronged plugs that fit matching receptacles provided in most U.S. campgrounds. 30 A U.S. RVs have electrical cords with three pronged plugs that fit matching receptacles in almost all U.S. campgrounds. Many campgrounds have both receptacles but some have only receptacles suitable for connecting three pronged plugs. An adapter can be employed to connect a four pronged plug from an a 50 A RV to a three prong receptacle. This would, of course, limit output to 30 A and the type and number of appliances that can be used at the same time.

BRIEF SUMMARY OF INVENTION

Disclosure of Invention

The present invention provides a transformer that can be connected between the electrical cord of a U.S. 50 A RV and thence directly to European receptacles providing from 220 to 240 volts, 50 hertz (hz) and 16 amps of electricity, thereby converting 220-240 volts to 110-120 volts, 60 hz and 50 amps of electrical current. U.S. built RVs are often shipped for use or sale overseas, particularly Europe; where they are rewired at a cost of several thousand dollars. The present transformer in contrast costs considerably less than one thousand dollars, a considerable saving. The U.S RV can thereby be used in both locations without modification.

It is therefore an object of this invention to provide a transformer designed specifically for use with recreational vehicles built in the U.S. for use overseas.

It is a further object of this invention to provide a unique transformer with the Plug and Play ability whereby a user can plug a U.S.-made RV into the secondary or output side of the transformer and then plug the primary or input side of the transformer into overseas electrical sockets to provide full use of the electrical appliances in the RV.

It is a further object of this invention to provide a transformer that can convert a vehicle wired for 120 volts for use in locations providing 220 volts, such as Europe.

The electrical units used in this specification include volts, hertz and amperes. A "volt" is sometimes abbreviated to "V"; a "hertz" is sometimes abbreviated to "hz"; and "amperes" is sometimes abbreviated to "amps" or "A". "Electrical outlets" are sometimes referred to "receptacles", "sockets" or "power points". 50 A receptacles have 4 terminals, two of which are hot. 30 A receptacles have 3 terminals, one of which is hot. Plugs have 4 prongs to fit 50 A receptacles, and 3 prongs to fit 30 A receptacles. Although most foreign electrical outlets provide 220 volts of electricity, their output is variable and can go as high as 240. Likewise most U.S. RVs are wired for 120 volts of electricity but they can function on voltages between 110 and 120. For purposes of this specification 220 volts can be assumed to be equivalent to the range of 220 to 240 volts and 110 can be assumed to be equivalent to the range of 110 to 120 volts as long as the ratio of approximately 2 to 1 is also assumed from the input side of the transformer to the output side. Since the electrical potential (volts), frequency (hertz) and current (amperes) of the electricity supplied in the U.S. and abroad vary from time to time and the efficiency of any electrical appliance including the present transformer is limited, the electrical units specified throughout this specification and claims are necessarily approximate.

The novel features of the present invention include the use of two cords emanating from the input side of a transformer for connection to the two receptacles generally provided in a single location in a European or overseas campground. The cords are hard wired into the primary circuit of the transformer.

Another novel feature of the present invention is the provision of a circuit breaker for each of the hot leads emanating from the output side of the transformer.

Since the receptacles often differ from country to country, the plugs on one end of the cords must be modified to fit each type of receptacle. Since U.S. RVs are wired for both 50 amps and 30 amps, campgrounds generally provide both 50 A and 30 A sockets. Each pair of side-by-side RV sites in a typical European campground for RVs has two sockets located between the sites on a single post providing 16 amps of current each. Connecting each cord of the transformer to each socket would provide 50 amps of current on the output side. The use of two appliances at the same time in the RV, such as an air conditioner and a microwave, requires more than 30 amps. When only one appliance is used in the RV, a single cord connected to a single receptacle can provide sufficient electricity to use the appliance.

From a broad perspective the present invention comprises a transformer having (1) an input side and an output side and (2) a primary circuit on the input side and a secondary circuit on the output side capable of converting 220 volts and 50 hertz of electricity to 120 volts and 60 hertz of electricity comprising (a) two cords, each having a first end and a second end, hard wired at the first end into the primary circuit on the input side of the transformer and a plug at the second end suitable for connection to a receptacle from an outside source of electricity providing 220 volts and 50 hertz of electricity and (b) a receptacle on the output side of the transformer suitable for receiving a plug connected to a cord to provide 110 volts and 60 hertz of electricity to an electrical appliance.

More specifically the foregoing transformer also converts 16 amps of current from each transformer plug to 50 amps of current to the receptacle on the output side and has a circuit breaker on each of two hot leads emanating from the secondary circuit.

LIST OF REFERENCE NUMERALS

Figure 1:
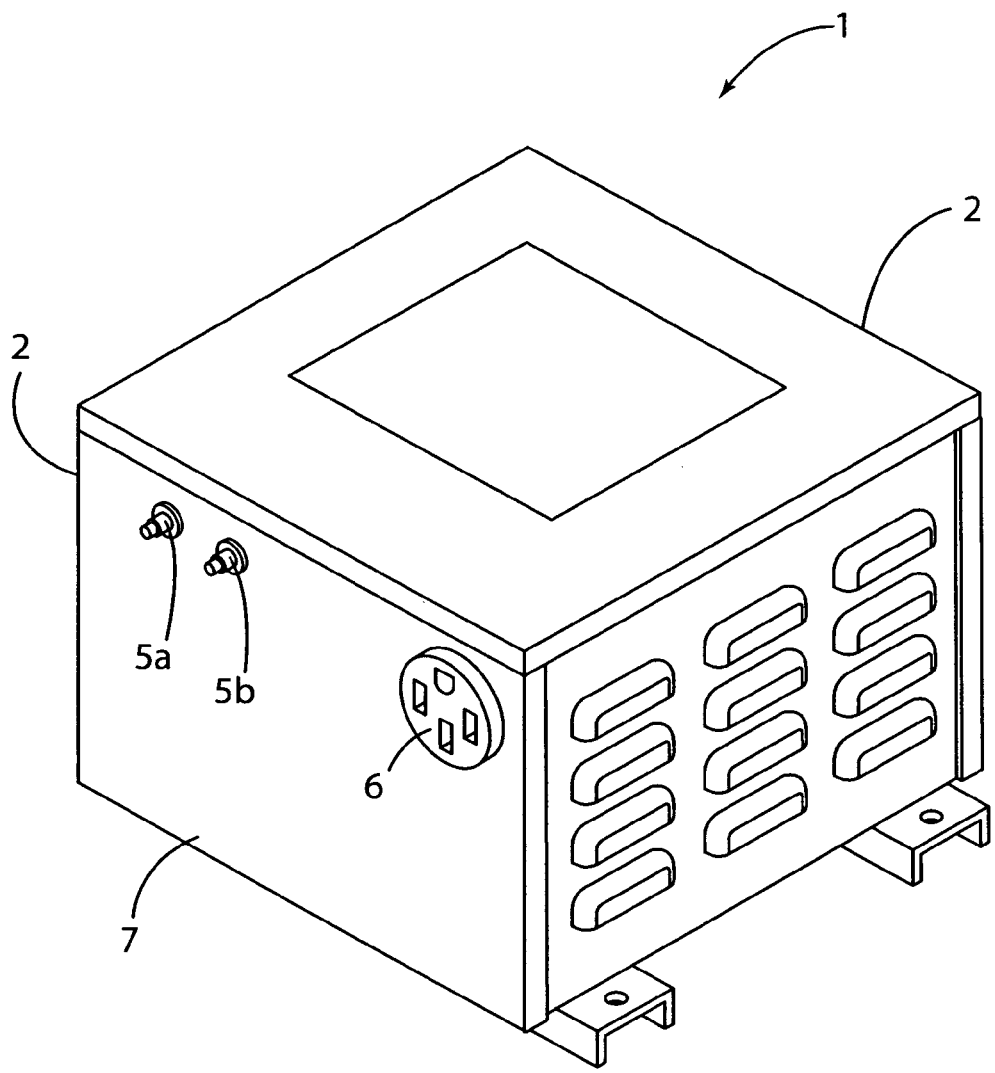
FIG. 1 is a perspective view of the transformer angled to show the output side of the transformer.

1 Transformer
2 Housing
3a, 3b Electrical cords
4a, 4b Hot leads
5a, 5b Circuit breakers
6 Output receptacle
7 Output side of transformer
8 Input side of transformer
9 Primary side of circuit
10 Secondary side of circuit
12a, 12b Typical campground receptacles
13 RV
14a, 14b White (neutral) leads from cords
15a, 15b Green-yellow (ground) leads from cords
16a, 16b Black (hot) leads from cords
17 Neutral lead to output receptacle
18 Equipment ground
20 System ground
21 Chassis ground
22 Metal plates
23a, 23b Hot terminals
25 Combined green-yellow and white terminal
26 RV cord
28 Campground post with sockets

DETAILED DISCLOSURE OF INVENTION

Best Mode of Carrying Out Invention

The preferred embodiment of the present invention comprises a transformer with the following electrical specifications:
Style: NEMA-3R Enclosed, Air Cooled, Dry type
Single Phase General Purpose Isolation Transformer
Primary voltage: 220 Volts
Frequency: 50/60 hz
Secondary Voltage: 120/240 Volts
Rating: 7 KVA
Insulation System: 200 Degrees Celsius
Temp Rise: 115 Celsius The preferred embodiment best shown in FIGS. 1 and 3 can be assembled from the following components using manufacturing procedures well known to those skilled in the art of producing transformers:
Transformer 1: Dongan Electric Manufacturing Company part number 81-7-3029PR; a single phase isolation transformer;
Enclosure 2: Dongan Electric Manufacturing Company, part number 765-EN-1099; a 14 ga galv. steel enclosure;
Receptacle 6: Leviton, part number 279PM-50A; 50 A 125/250V;
Circuit Breakers 5a,5b: ETA part number 1658-G21-01-P10; 30 A; and
Cords 3a,3b: Carol Cables, part number CORD SOOW12/3BLK; 12/3 90C 600V.

None of the foregoing specific components are critical to the present invention since available alternatives known to those skilled in manufacturing transformers can be substituted without detracting from the essential features of the present invention required to step down. 220-240 volts of electricity to 110-120 volts and deliver at least 30-50 amps of current. More specifically the transformer has the capacity to convert 220V 50 hz 16 A current to 120V 60 hz 50 A current output load capacity to allow full use of the electrical appliances in a 50 A US RV. The housing 2 of the preferred embodiment is 13×12 inches at the base, 12×12 inches on top and 10 inches high. The RV or output receptacle 6 and the circuit breakers 5a,5b are located on one side and the two cords 3a,3b extend from the opposite side of the transformer 1. The 600V Service cords 3a,3b are 16 feet long, CSA weather and water resistant and approved for indoor and outdoor use. The outer jacket and insulation are oil resistant. The foregoing dimensions are not critical and can be varied without departing from the essential features of the present invention as described hereinafter.

The most critical feature of the present invention is the use of two cords 3a,3b hard wired at one end into the primary circuit 9 of the transformer 1 with a plug (not shown) at the other end. The plug has three prongs, one of which is hot, and one is a ground, suitable for connection to electrical receptacles 12a,12b of most foreign campgrounds generally providing 220V of electricity. An additional preferred safety feature of the present invention is the incorporation of circuit breakers 5a,5b in each hot lead 4a,4b emanating from the output side 7 of the transformer 1.

Figure 2:
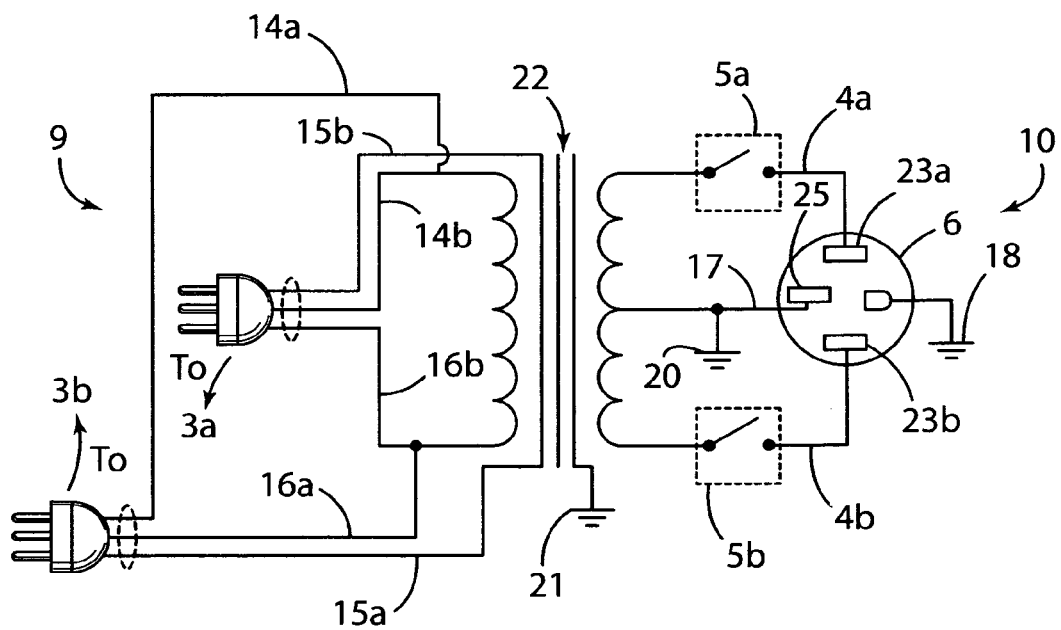
FIG. 2 is a diagram of the electrical circuit employed in the transformer.

The circuit is depicted in FIG. 2. The circuit comprises two coils on the primary side paired with two coils on the secondary side of the circuit. Like all transformers the coils are wound around the core and, since the transformer steps the voltage down in a ratio of approximately two to one, there are approximately twice as many turns on the primary side as there are on the secondary side. The core, coils and turns are not shown in detail. Such detail is well within the ordinary skill of those skilled in the art of producing transformers. Functionally the transformer operates like two transformers in a single housing wired to provide one outlet for the combined output of the two transformers.

Three wires emanate from the three-pronged plugs (not shown) to the primary side of the circuit. Most foreign campgrounds have three-pronged sockets. The white neutral leads 14a,14b are connected to the core and case of the transformer. The green-yellow ground leads 15a,15b are connected to the core. The black hot leads 16a,16b are connected to the core. Although only three wires 4a,4b,17 are shown to connect to the output receptacle 6 from the secondary side of the circuit, a green-yellow lead (not shown) is also connected to terminal 25 along with the white neutral lead 17. Two terminals are black hot leads 4a,4b and one is a white neutral lead 17.

Theoretically a transformer like that described is capable of converting 220 volts and 16 amps of current from each cord 3a,3b to 110 volts and 32 amps of current to each hot lead 4a,4b but some loss of efficiency is bound to occur in the conversion. To satisfy the electricity requirements of a 50 A RV, only 50 amps of current is required.

Using the foregoing embodiment of the present invention the user can simply (1) plug the shore line power cord 26 of an RV 13 into the 50 amp output receptacle 6 located on the output side 7 of the transformer 1 and (2) plug the individual power cords 3a,3b located on the input side 8 of the transformer 1 into two separate 220 volt campground receptacles 12a,12b. The user would then have full use of all of the electrical appliances in a 50 A RV.

Figure 3:
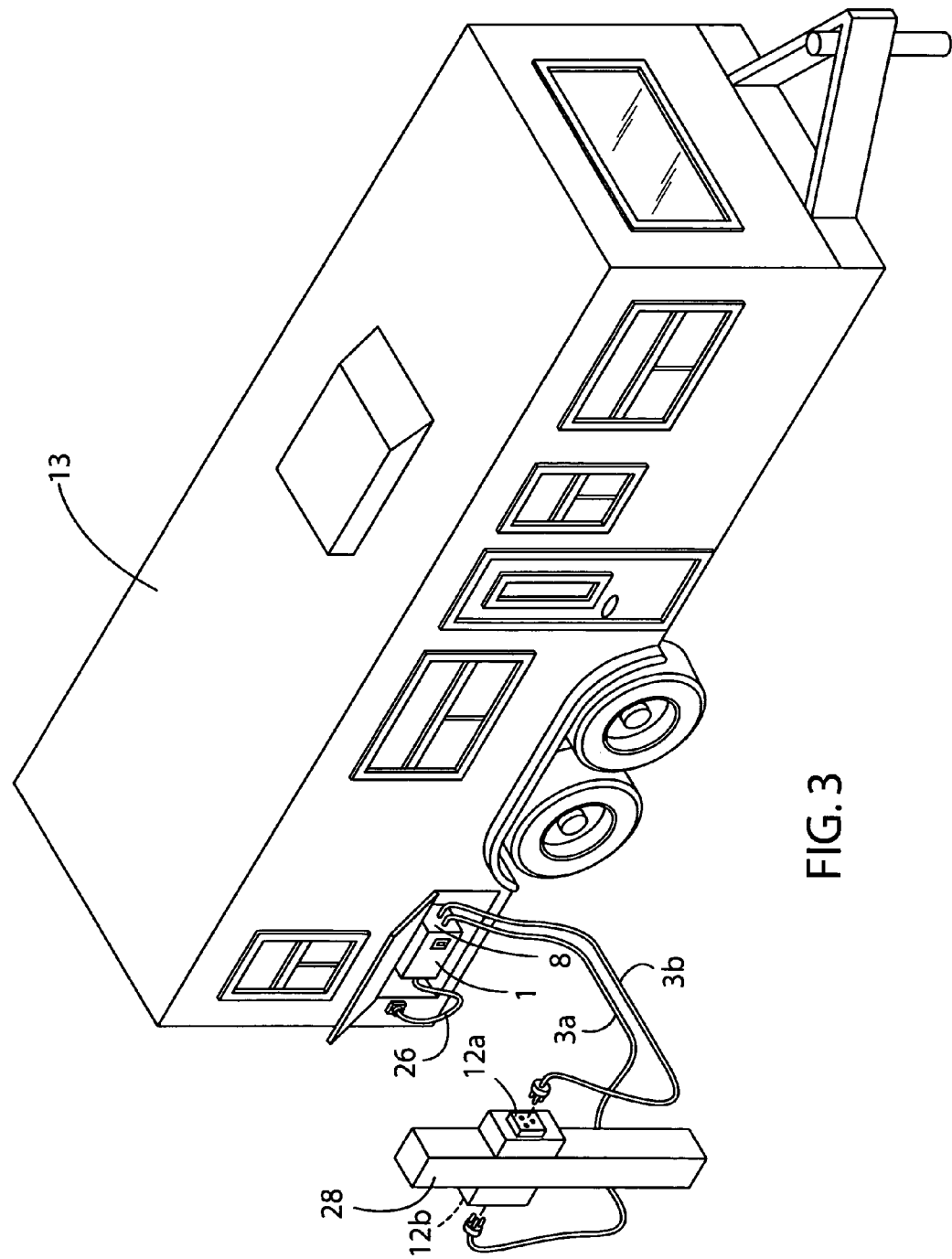
FIG. 3 is a perspective drawing showing the transformer (angled to show the input side of the transformer) connected between an RV and two campground receptacles.

When only one campground receptacle 12a is available, the user can still plug one transformer power cord 3a into a single 220 volt campground receptacle 12a but the user would be limited in the number and type of appliances he can use at the same time. This approach is acceptable for a 30 A RV. To take advantage of both receptacles usually located between two side-by-side campsites as shown in FIG. 3, which would be necessary for full use of the appliances in a 50 A RV, the user may have to rent both campsites to assure use of both receptacles to avoid rental of the side-by-side campsites to different parties.

Although the embodiment shown is primarily designed for use with receptacles providing four terminals for four pronged RV plugs generally employed in U.S. 50 A RVs. An adapter (not shown) can be used to accommodate a four pronged plug to a three-prong receptacle although that would limit the current output to 30 A.

Although the transformer of the present invention is designed primarily for use with RVs, it can also be used to provide electricity to any appliance, such as welding equipment, that requires 30-50 amps of current from a 220V source.

The foregoing provides a general description and a preferred embodiment of the present invention. It should be understood various substitutions, variations and modifications can be made by those skilled in the art without departing from the spirit and scope of the invention as further delineated in the following claims.

The invention claimed is:

1. A transformer to convert two sources of electrical current providing about 220 volts of electricity to a user requiring about 110 volts of electricity and greater power capacity than each source provides separately, the transformer having
   a) an input side with a primary coil,
   b) an output side with a secondary coil,
   c) two cords each wired to the primary coil,
   d) each cord terminating in a three pronged plug connected through the cords to the primary coil with a hot lead wire, a neutral lead wire and a ground wire and
   e) a receptacle wired to the secondary coil with two hot wires, a neutral wire and a ground wire
wherein
   f) the primary coil has twice as many turns as the coil on the secondary coil,
   g) the plug on each cord has three prongs configured to connect to a three wire power line consisting of a hot wire, a neutral wire and a ground wire,
   h) the receptacle on the second side is adapted to receive a four pronged plug from a user of electrical power requiring greater capacity than that provided through each cord separately.

2. The transformer of claim 1 further comprising the plug on each of the cords connected to the input side of the transformer is configured to connect to receptacles wired for about 220 volts, 50 hertz, and 16 amperes at campgrounds for recreational vehicles and the receptacle on the output side of the transformer is configured to connect to a power cord from a recreational vehicle wired for about 120 volts, 60 hertz, and 50 amperes of electricity.

3. The transformer of claim 1 further comprising circuitry and wiring capable of converting from about 220 volts and about 16 amperes of electricity from each cord on the input side of the transformer to about 110 volts and about 50 amperes at the receptacle on the output side of the transformer.

4. The transformer of claim 1 further comprising a circuit breaker located on each of the hot leads emanating from the output side of the transformer.

5. The transformer of claim 4 further comprising an output of about 30 amperes of electrical current at each hot lead when the two cords on the input side of the transformer are connected to two receptacles, each receptacle providing about 16 amperes of electrical current.

6. The transformer of claim 1 further comprising circuitry capable of producing about 120 volts, about 60 hertz and about 50 amperes of electricity when both cords on the input side of the transformer are separately connected to receptacles providing about 220 volts, about 50 hertz and about 16 amperes of electricity.

\* \* \* \* \*

UNITED STATES PATENT AND TRADEMARK OFFICE
CERTIFICATE OF CORRECTION

PATENT NO. : 8,971,083 B1  Page 1 of 1
APPLICATION NO. : 12/661922
DATED : March 3, 2015
INVENTOR(S) : Johnson It is certified that error appears in the above-identified patent and that said Letters Patent is hereby corrected as shown below:

In the claims,
Column 6, line 6, claim 1, change "second" to --output--

Signed and Sealed this
Fifteenth Day of March, 2016

Michelle K. Lee
*Director of the United States Patent and Trademark Office*